United States Patent
Farachi et al.

(10) Patent No.: US 6,918,478 B2
(45) Date of Patent: Jul. 19, 2005

(54) METHOD AND UNIT FOR CONTROLLING A CLUTCH POWERED BY A HYDRAULIC ACTUATOR

(75) Inventors: Francesco Farachi, San Pietro Vernotico (IT); Amedeo Visconti, Turin (IT); Alberto Tonielli, Imola (IT)

(73) Assignee: Ferrari S.p.A., Modena (IT)

( * ) Notice: Subject to any disclaimer, the term of this patent is extended or adjusted under 35 U.S.C. 154(b) by 15 days.

(21) Appl. No.: 10/748,220

(22) Filed: Dec. 31, 2003

(65) Prior Publication Data

US 2004/0216977 A1 Nov. 4, 2004

(30) Foreign Application Priority Data

Jan. 2, 2003 (IT) .................................... BO2003A0002

(51) Int. Cl.⁷ ............................................. F16D 48/06
(52) U.S. Cl. ................................ 192/85 R; 192/109 F; 701/67
(58) Field of Search .......................... 192/85 R, 109 F, 192/85 C, 85 CA, 91 R, 91 A; 477/174, 180; 701/67

(56) References Cited

U.S. PATENT DOCUMENTS

| | | | |
|---|---|---|---|
| 5,337,874 A | | 8/1994 | Oltean et al. |
| 5,393,274 A | * | 2/1995 | Smedley ........................ 477/74 |
| 2002/0055415 A1 | * | 5/2002 | Yoshikawa et al. ......... 477/180 |
| 2005/0043139 A1 | * | 2/2005 | Kennedy ..................... 477/98 |

FOREIGN PATENT DOCUMENTS

| | | |
|---|---|---|
| DE | 195 16 404 A1 | 11/1996 |
| DE | 2 301 404 A * | 12/1996 |
| EP | 0 628 742 A1 | 12/1994 |
| GB | 2 296 046 A | 6/1996 |

* cited by examiner

*Primary Examiner*—Rodney H. Bonck
(74) *Attorney, Agent, or Firm*—Birch, Stewart, Kolasch & Birch, LLP

(57) ABSTRACT

A method and unit for controlling a clutch powered by a hydraulic actuator having a work chamber connected to a solenoid valve; a target value of the pressure of the fluid inside the work chamber is generated, an actual value of the pressure of the fluid inside the work chamber is measured, and a control signal for controlling the solenoid valve is calculated using feedback control of the pressure of the fluid inside the work chamber; and the target value of the pressure of the fluid is generated on the basis of an actual value of the position of the hydraulic actuator, and of a target value of the position of the hydraulic actuator.

14 Claims, 3 Drawing Sheets

METHOD AND UNIT FOR CONTROLLING A CLUTCH POWERED BY A HYDRAULIC ACTUATOR

This Nonprovisional application claims priority under 35 U.S.C. § 119(a) on Patent Application No(s). BO2003A 000002 filed in ITALY on Jan. 2, 2003, the entire contents of which are hereby incorporated by reference.

The present invention relates to a method of controlling a clutch powered by a hydraulic actuator.

BACKGROUND OF THE INVENTION

The internal combustion engine of a vehicle transmits power to the vehicle via a transmission train comprising a gearbox and a clutch, which are normally operated by the driver of the vehicle. Power-assisted manual shifts, however, are becoming increasingly popular, and which are structurally similar to a conventional manual shift, except that the driver-operated control pedals and levers are replaced by corresponding electric or hydraulic servocontrols. Using a power-assisted manual shift, the driver simply sends an up- or downshift command to a central control unit, which automatically shifts gears by acting on the various servocontrols.

When a gear shift is commanded by the driver, a clutch servocontrol releases the clutch, a shift servocontrol makes the desired gear shift, and the clutch servocontrol re-engages the clutch. The servocontrols are obviously controlled and operated using sensors for real-time determining the values of various reference quantities of the gearbox-clutch system.

A power-assisted manual gearshift is typically expected to provide for both dynamic performance and passenger comfort, which call for fast gear shifting with no passenger-perceptible oscillations. To achieve this, correct clutch position control is essential, in that both shift time and any oscillations produced are determined by operation of the clutch. Currently marketed hydraulic-actuator-powered clutches, however, fail to provide for correct clutch position control in all operating conditions.

SUMMARY OF THE INVENTION

It is an object of the present invention to provide a method of controlling a clutch powered by a hydraulic actuator, which is cheap and easy to implement, and which at the same time provides for eliminating the aforementioned drawbacks.

According to the present invention, there is provided a method of controlling a clutch powered by a hydraulic actuator, as claimed in claim 1.

The present invention also relates to a unit for controlling a clutch powered by a hydraulic actuator.

According to the present invention, there is provided a control unit for controlling a clutch powered by a hydraulic actuator, as claimed in claim 10.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
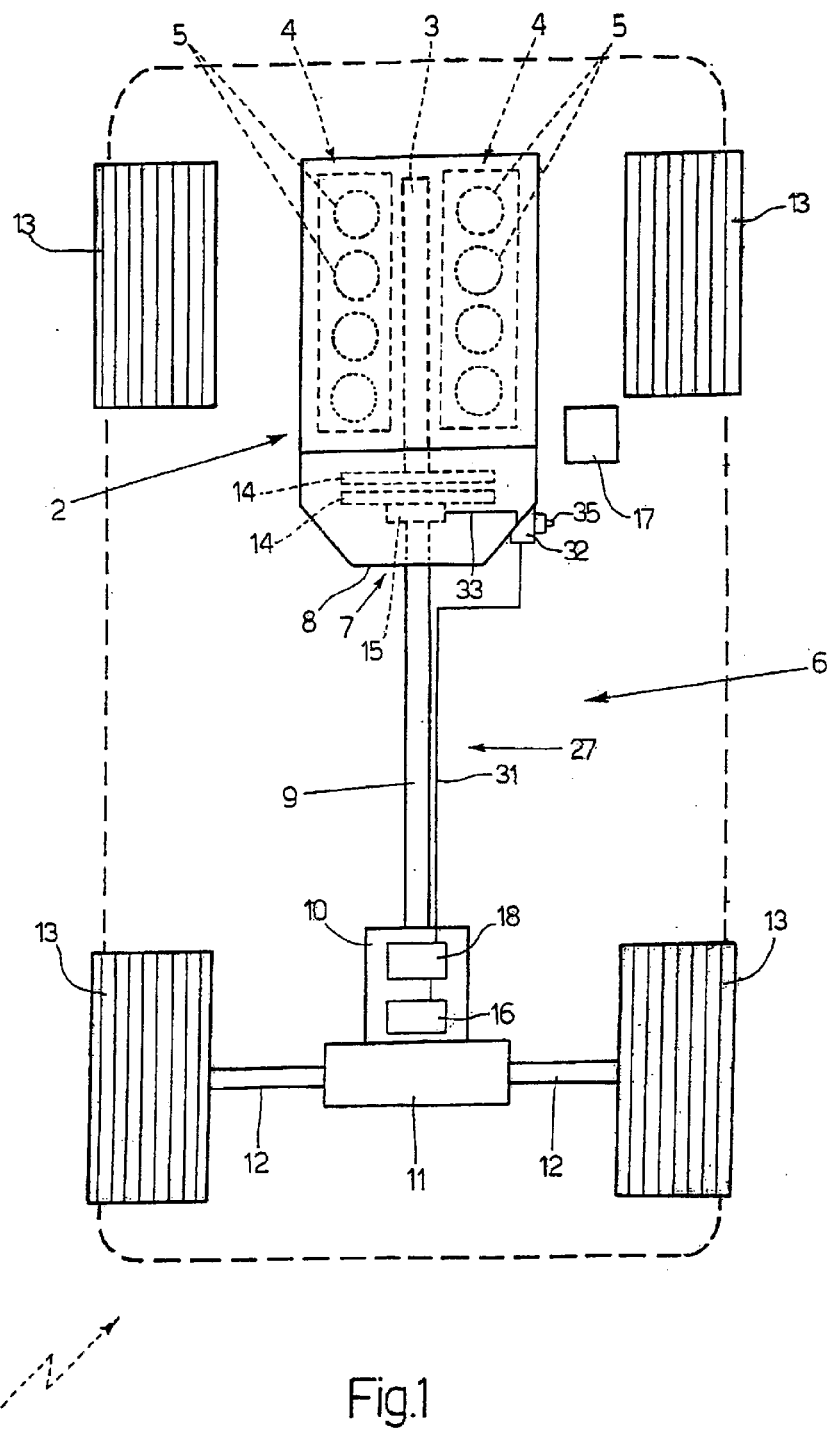
FIG. 1 shows a schematic view of a vehicle featuring a power clutch controlled by the control unit according to the present invention.

Number 1 in FIG. 1 indicates a vehicle comprising a front internal combustion engine 2, which comprises a drive shaft 3 and two rows 4 of four cylinders 5 each. In actual use, engine 2 produces on drive shaft 3 a drive torque which is transmitted to the road surface by a transmission train 6 to move vehicle 1.

Transmission train 6 comprises a power clutch 7, which is housed in a housing 8 integral with engine 2, and connects drive shaft 3 to a propeller shaft 9 terminating in a mechanical power-assisted gearbox 10 at the rear axle. A differential 11 is cascade-connected to gearbox 10, and from which extend two axle shafts 12, each integral with a respective rear drive wheel 13.

Clutch 7 comprises two disks 14 respectively integral with drive shaft 3 and propeller shaft 9, and which are movable with respect to each, by a known hydraulic actuator 15, between a closed position (clutch engaged), in which the two disks 14 contact to transmit the drive torque from drive shaft 3 to propeller shaft 9, and an open position (clutch released), in which the two disks 14 are detached to disconnect drive shaft 3 and propeller shaft 9.

Gearbox 10 has a hydraulic actuator 16 for varying, in known manner, the gear ratio of gearbox 10 by varying the position of a secondary shaft (not shown), angularly integral with differential 11, with respect to the position of a primary shaft (not shown) angularly integral with propeller shaft 9.

Hydraulic actuators 15 and 16 are both controlled by the same central control unit 17 by means of a series of solenoid valves (not shown in detail in FIG. 1). To perform its control function, central control unit 17 is connected to a series of sensors (not shown in detail in FIG. 1) to acquire both driver commands and the values of various system reference quantities.

Figure 2:
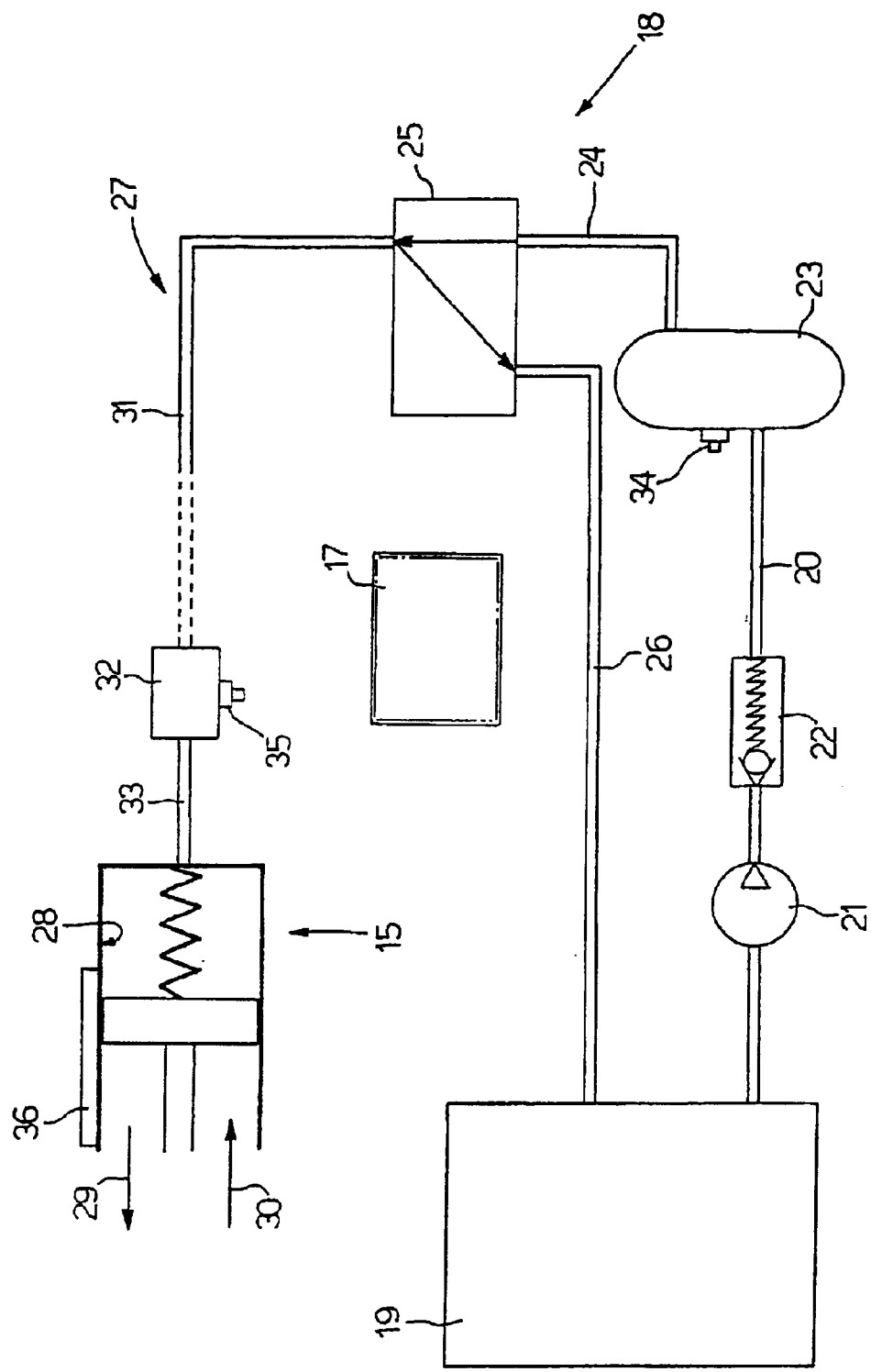
FIG. 2 shows an operating diagram of a hydraulic actuator of the FIG. 1 clutch.

As shown in FIG. 2, hydraulic actuator 15 controlling clutch 7 is controlled by central control unit 17 by means of a hydraulic circuit 18, which is also partly used to control hydraulic actuator 16 and for this reason is substantially located at the rear axle and fitted to gearbox 10.

Hydraulic circuit 18 is filled with oil, and comprises an atmospheric-pressure oil tank 19, from which extends a pipe 20 fitted with a pump 21 and a non-return valve 22 to supply pressurized oil to a hydraulic accumulator 23; and hydraulic accumulator 23 is connected by a pipe 24 to an inlet of a proportional solenoid valve 25, from which extend a pipe 26 terminating in tank 19, and a pipe 27 terminating in a work chamber 28 of hydraulic actuator 15. More specifically, solenoid valve 25 is designed to isolate pipe 27, and therefore work chamber 28, from pipes 24 and 26 to keep hydraulic actuator 15 in a given position; is designed to connect pipe 27, and therefore work chamber 28, to pipe 24 to feed pressurized oil to work chamber 28 and move hydraulic actuator 15 in a direction 29; and is designed to connect pipe 27, and therefore work chamber 28, to conduit 26 to draw pressurized oil from work chamber 28 and move hydraulic actuator 15 in a direction 30 opposite direction 29.

Tank 19, hydraulic accumulator 23, and solenoid valve 25 are located at the rear axle and fitted to gearbox 10; and pipe 27 extends from the rear axle and terminates in work chamber 28 of hydraulic actuator 15, which is housed inside housing 8 of clutch 7. More specifically, pipe 27 is defined by a flexible portion 31 connecting solenoid valve 25 to a connecting block 32 integral with housing 8 of clutch 7, and by a rigid portion 33 connecting block 32 to work chamber 28.

Hydraulic accumulator 23 is fitted with a sensor 34 connected to central control unit 17 and for real-time determining the actual value Pp of the oil pressure inside hydraulic accumulator 23; and connecting block 32 is fitted with a sensor 35 connected to central control unit 17 and for real-time determining the actual value Put of the oil pressure inside rigid portion 33 of pipe 27. It should be pointed out that, given the short length (roughly 25–35 cm) of rigid portion 33, the value of the oil pressure inside rigid portion 33 practically equals the value of the oil pressure inside work chamber 28 of hydraulic actuator 15. Finally, hydraulic actuator 15 is fitted with a potentiometer 36 connected to central control unit 17 and for real-time determining the position of hydraulic actuator 15 (and therefore of clutch 7, which is mechanically integral with hydraulic actuator 15).

Figure 3:
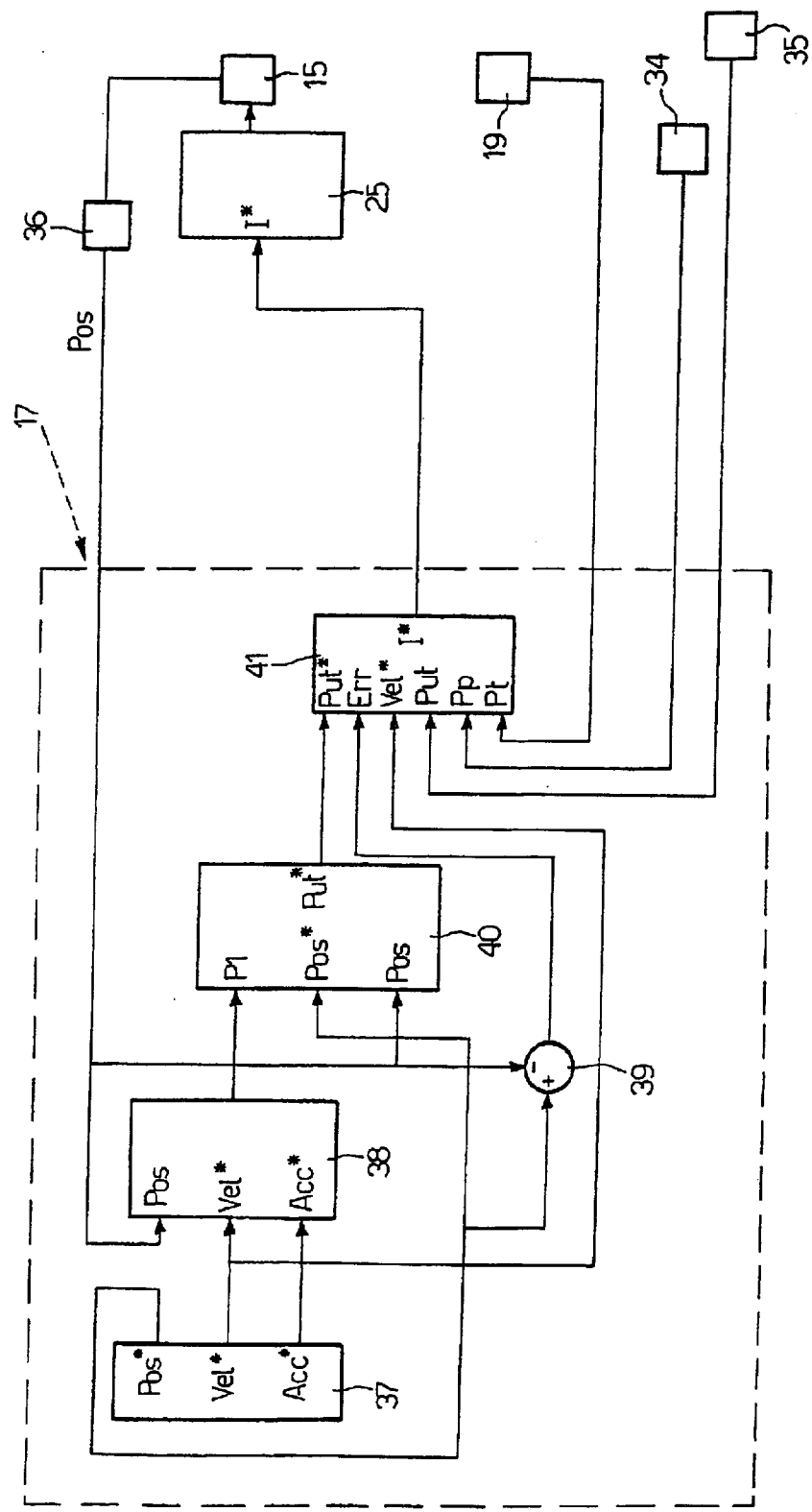
FIG. 3 shows a block diagram of the control unit controlling the power clutch in FIG. 1.

As shown in FIG. 3, central control unit 17 employs a reference generator 37, which generates a target value Pos* of the position of hydraulic actuator 15, a target value Vel* of the speed of hydraulic actuator 15 (i.e. the derivative prior to target value Pos*, and a target value Acc* of the acceleration of hydraulic actuator 15 (i.e. the derivative prior to target value Pos*). More specifically, reference generator 37 generates the desired values according to known control methods and as a function of both drive-entered commands and the operating conditions of vehicle 1.

Target value Vel* of the speed of hydraulic actuator 15, and target value Acc* of the acceleration of hydraulic actuator 15 are supplied by reference generator 37 to a computing block 38, which also receives the actual value Pos of the position of hydraulic actuator 15 (and therefore of clutch 7 mechanically integral with hydraulic actuator 15) determined in real time by potentiometer 36. And, on the basis of the Pos, Vel* and Acc* values, computing block 38 calculates a forecast value P1 predicting the future value Put of the oil pressure inside work chamber 28.

Central control unit 17 also employs a differential block 39, which calculates the value Err of the error in the position of hydraulic actuator 15 (i.e. the difference between the target value Pos* and the actual value Pos of the position of hydraulic actuator 15).

The forecast value P1, the target value Pos* of the position of hydraulic actuator 15, and the actual value Pos of the position of hydraulic actuator 15 are supplied to a Bode regulator 40, which, on the basis of values P1, Pos* and Pos, determines a target value Put* of the oil pressure inside work chamber 28. In other words, Bode regulator 40 determines the target value Put* of the oil pressure inside work chamber 28 required for the actual value Pos of the position of hydraulic actuator 15 to match the target value Pos* of the position of hydraulic actuator 15.

Finally, central control unit 17 employs a controller 41 for generating the target value I* of the current circulating in the electric actuator (not shown in detail) of solenoid valve 25. More specifically, the electric actuator of solenoid valve 25 implements feedback control of the current circulating through the electric actuator itself.

Controller 41 receives the target value Put* of the oil pressure inside work chamber 28, the value Err of the error in the position of hydraulic actuator 15, the target value Vel* of the speed of hydraulic actuator 15, the actual value Put of the oil pressure inside work chamber 28, as determined by sensor 35, the actual value Pp of the oil pressure inside hydraulic accumulator 23, as determined by sensor 34, and the actual value Pt of the oil pressure inside tank 19 (not sensor-detected, but considered substantially constant and equal to atmospheric pressure). It is important to note that the actual oil pressure value Pp is the pressure value of the oil supplied to work chamber 28, while oil pressure value Pt is the pressure value of the oil drained from work chamber 28.

As will be clear from the foregoing description, three feedback control loops are employed to control the position of hydraulic actuator 15 (i.e. of clutch 7), i.e. to control the actual value Pos of the position of hydraulic actuator 15. A first feedback control loop is controlled by Bode regulator 40, employs the actual value Pos of the position of hydraulic actuator 15 as the feedback variable, and supplies the target value Put* of the oil pressure inside work chamber 28. A second feedback control loop is controlled by controller 41, employs the actual value Put of the oil pressure inside work chamber 28 as the feedback variable, and supplies the target value I* of the current circulating in the electric actuator of solenoid valve 25. And a third feedback control loop is controlled by the actuator of solenoid valve 25, and employs the measured current circulating through the actuator as the feedback variable.

Tests have shown that, by virtue of sensor 35 for determining the actual value Put of the oil pressure inside work chamber 28, central control unit 17 is capable of ensuring optimum control of the position of clutch 7 in any operating condition.

What is claimed is:

1. A method of controlling a clutch (7) powered by a hydraulic actuator (15) comprising a work chamber (28), which is filled with a fluid and connected to a solenoid valve (25) for selective connection to a drain tank (19) for draining the fluid, or to a storage tank (23) for accumulating pressurized fluid; the method providing for generating a target value (Pos*) of the position of the hydraulic actuator (15), measuring an actual value (Pos) of the position of the hydraulic actuator (15), and calculating a control signal (I*) for controlling the solenoid valve (25) by feedback control of the position of the hydraulic actuator (15); and the method being characterized by generating a target value (Put*) of the pressure of the fluid inside the work chamber (28), estimating an actual value (Put) of the pressure of the fluid inside the work chamber (28), and calculating the control signal (I*) using both feedback control of the position of the hydraulic actuator (15), and feedback control of the pressure of the fluid inside the work chamber (28).

2. A method as claimed in claim 1, wherein the actual value (Put) of the pressure of the fluid inside the work chamber (28) is estimated by a pressure measurement inside the work chamber (28).

3. A method as claimed in claim 1, wherein the actual value (Put) of the pressure of the fluid inside the work chamber (28) is estimated by a pressure measurement inside a pipe (27) extending between the work chamber (28) and the solenoid valve (25) and connected permanently to the work chamber (28).

4. A method as claimed in claim 3, wherein the pressure measurement is made by a sensor (35) located inside the pipe (27) and close to the work chamber (28).

5. A method as claimed in claim 1, wherein the target value (Put*) of the pressure of the fluid inside the work chamber (28) is generated as a function of the actual value (Pos) of the position of the hydraulic actuator (15), and of the target value (Pos*) of the position of the hydraulic actuator (15).

6. A method as claimed in claim 5, wherein a forecast value (P1) predicting the value of the pressure of the fluid inside the work chamber (28) is calculated; the target value (Put*) of the pressure of the fluid inside the work chamber (28) being generated as a function of the actual value (Pos) of the position of the hydraulic actuator (15), of the target value (Pos*) of the position of the hydraulic actuator (15), and of the forecast value (P1).

7. A method as claimed in claim 6, wherein a target value (Vel*) of the speed of the hydraulic actuator (15), and a target value (Acc*) of acceleration of the clutch are generated; the forecast value (P1) being generated as a function of the actual value (Pos) of the position of the hydraulic actuator (15), of the target value (Vel*) of the speed of the hydraulic actuator, and of the target value (Acc*) of acceleration of the clutch.

8. A method as claimed in claim 1, wherein a target value (Vel*) of the speed of the hydraulic actuator (15) is generated, an actual value (Pt) of the pressure of the fluid in the drain tank (19) is estimated, and an actual value (Pp) of the pressure of the fluid in the storage tank (23) is measured; the control signal (I*) being calculated as a function of the actual value (Put) of the pressure of the fluid inside the work chamber (28), of the target value (Put*) of the pressure of the fluid inside the work chamber (28), of the difference between the target value (Pos*) and actual value (Pos) of the position of the hydraulic actuator (15), of the target value (Vel*) of the speed of the hydraulic actuator, of the actual value (Pt) of the pressure of the fluid in the drain tank (19), and of the actual value (Pp) of the pressure of the fluid in the storage tank (23).

9. A method as claimed in claim 1, wherein the control signal (I*) represents a target value of the current circulating in an electric actuator of the solenoid valve (25); the electric actuator of the solenoid valve (25) implementing feedback control of the current circulating through the electric actuator itself.

10. A control unit (17) for controlling a clutch (7) powered by a hydraulic actuator (15) comprising a work chamber (28), which is filled with a fluid and connected to a solenoid valve (25) for selective connection to a drain tank (19) for draining the fluid, or to a storage tank (23) for accumulating pressurized fluid; the control unit (17) comprising a reference generator (37) for generating a target value (Pos*) of the position of the hydraulic actuator (15), a first sensor (36) for measuring an actual value (Pos) of the position of the hydraulic actuator (15), and a controller (41) for calculating a control signal (I*) for controlling the solenoid valve (25) by feedback control of the position of the hydraulic actuator (15); and the control unit (17) being characterized by comprising a second sensor (35) for estimating an actual value (Put) of the pressure of the fluid inside the work chamber (28), and a regulator (40) for generating a target value (Put*) of the pressure of the fluid inside the work chamber (28); the controller (41) calculating the control signal (I*) using both feedback control of the position of the hydraulic actuator (15), and feedback control of the pressure of the fluid inside the work chamber (28).

11. A control unit (17) as claimed in claim 10, wherein a pipe (27) extends between the work chamber (28) and the solenoid valve (25), is connected permanently to the work chamber (28), and houses the second sensor (35) close to the work chamber (28).

12. A control unit (17) as claimed in claim 11, wherein the pipe (27) is defined by a flexible portion (31) connecting the solenoid valve (25) to a connecting block (32) integral with a housing (8) of the clutch (7), and by a rigid portion (33) connecting the connecting block (32) to the work chamber (28).

13. A control unit (17) as claimed in claim 10, wherein the regulator (40) generates the target value (Put*) of the pressure of the fluid inside the work chamber (28) as a function of the actual value (Pos) of the position of the hydraulic actuator (15), and of the target value (Pos*) of the position of the hydraulic actuator (15).

14. A control unit (17) as claimed in claim 10, and comprising a computing block (38) for calculating a forecast value (P1) predicting the value of the pressure of the fluid inside the work chamber (28); the regulator (40) generating the target value (Put*) of the pressure of the fluid inside the work chamber (28) as a function of the actual value (Pos) of the position of the hydraulic actuator (15), of the target value (Pos*) of the position of the hydraulic actuator (15), and of the forecast value (P1).

* * * * *